(12) United States Patent
Flanagan et al.

(10) Patent No.: US 9,730,086 B2
(45) Date of Patent: Aug. 8, 2017

(54) TECHNIQUES FOR DYNAMIC NETWORK OPTIMIZATION USING GEOLOCATION AND NETWORK MODELING

(71) Applicant: Viavi Solutions UK Limited, Berkshire (GB)

(72) Inventors: Michael Flanagan, Chester, NJ (US); Nicholas James Randell, Alton (GB); Mohsen Zadeh-Koochak, Woolton Hill (GB); David Charles Padfield, Marlborough (GB); Mihai Stanciuc, Newbury (GB); Howard John Thomas, Stonehouse (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/599,837

(22) Filed: Jan. 19, 2015

(65) Prior Publication Data

US 2016/0212634 A1    Jul. 21, 2016

(51) Int. Cl.
| | |
|---|---|
| *H04W 24/00* | (2009.01) |
| *H04W 24/02* | (2009.01) |
| *H04W 16/18* | (2009.01) |
| *H04W 64/00* | (2009.01) |
| *H04W 84/18* | (2009.01) |

(52) U.S. Cl.
CPC ........... *H04W 24/02* (2013.01); *H04W 16/18* (2013.01); *H04W 64/003* (2013.01); *H04W 84/18* (2013.01)

(58) Field of Classification Search
CPC ............................... H04W 24/08; H04L 51/04

USPC ..... 455/456.1, 423, 425, 424; 370/229, 230, 370/252, 254; 340/815.4
See application file for complete search history.

(56) References Cited

U.S. PATENT DOCUMENTS

| | | | |
|---|---|---|---|
| 8,374,596 B2 | 2/2013 | Thiel et al. | |
| 2011/0319093 A1 | 12/2011 | Flanagan | |
| 2012/0087269 A1 | 4/2012 | Hussein et al. | |
| 2012/0309376 A1* | 12/2012 | Huang | H04M 1/72572 455/418 |

(Continued)

OTHER PUBLICATIONS

NGMN Alliance, "Next Generation Mobile Networks; A Deliverable by the NGMN Alliance NGMN Top OPE Recommendations," NGMN Top OPE Recommendations, by NGMN Alliance, Version 1.0, Sep. 21, 2010, 44 pages.

(Continued)

*Primary Examiner* — Kiet Doan
(74) *Attorney, Agent, or Firm* — Harrity & Harrity, LLP

(57) ABSTRACT

Techniques for dynamic network optimization using geolocation and network modeling are disclosed. In one particular exemplary embodiment, the techniques may be realized as a system for improving performance of a mobile communications network. The system may comprise one or more processors communicatively coupled to a mobile communications network. The one or more processors may be configured to determine allowable changes within a network and rank a cell or parameter based on a priority rule. The one or more processors may be further be configured to generate a plurality of network configurations and evaluate strength of the plurality of network configurations. The one or more processors may also be configured to output a set of network configurations that is strongest among the plurality of network configurations.

20 Claims, 5 Drawing Sheets

(56) References Cited

U.S. PATENT DOCUMENTS

| | | | |
|---|---|---|---|
| 2013/0157688 A1 | 6/2013 | Kateley et al. | |
| 2013/0210449 A1 | 8/2013 | Flanagan | |
| 2013/0210450 A1* | 8/2013 | Kenington | G01S 5/0252 455/456.1 |
| 2014/0171102 A1 | 6/2014 | Murphy et al. | |
| 2014/0171103 A1 | 6/2014 | Murphy et al. | |
| 2014/0269364 A1* | 9/2014 | Knapp | H04W 84/18 370/252 |
| 2014/0293979 A1 | 10/2014 | Gormley et al. | |
| 2014/0357250 A1* | 12/2014 | Nitsan | H04W 24/06 455/418 |
| 2015/0149091 A1* | 5/2015 | Milton | H04W 4/028 702/2 |

OTHER PUBLICATIONS

Extended European Search Report corresponding to EP Application No. 16 15 1601, mailed May 20, 2016, 8 pages.

* cited by examiner

TECHNIQUES FOR DYNAMIC NETWORK OPTIMIZATION USING GEOLOCATION AND NETWORK MODELING

FIELD OF DISCLOSURE

The present disclosure relates to network optimization, and more particularly, to techniques for dynamic network optimization using geolocation and network modeling.

BACKGROUND

Mobile communication devices, such as smart phones, tablets, and other electronic hand-held devices, are becoming increasingly popular. In order to support the growing number of mobile communications devices, wireless communications systems employ radio network subsystems with macro cells using one or more high-powered base stations. Although advances in technology have made it possible for these base stations to cover relatively large geographical areas to improve mobile communications, this is a one-size-fits-all approach that may not adequately leverage network resources to fully optimize a network for mobile communications. For instance, current systems fail to utilize detailed knowledge of individual users, their devices, habits, trends, and other specific information to provide simulated performance calculations to better allocate network resources in order to implement a more efficient, focused, and customized network plan. In view of the foregoing, it may be understood that there may be significant problems and shortcomings associated with current solutions and technologies for network optimization and efficiently and effectively improving network performance.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION OF EMBODIMENTS

Figure 1:
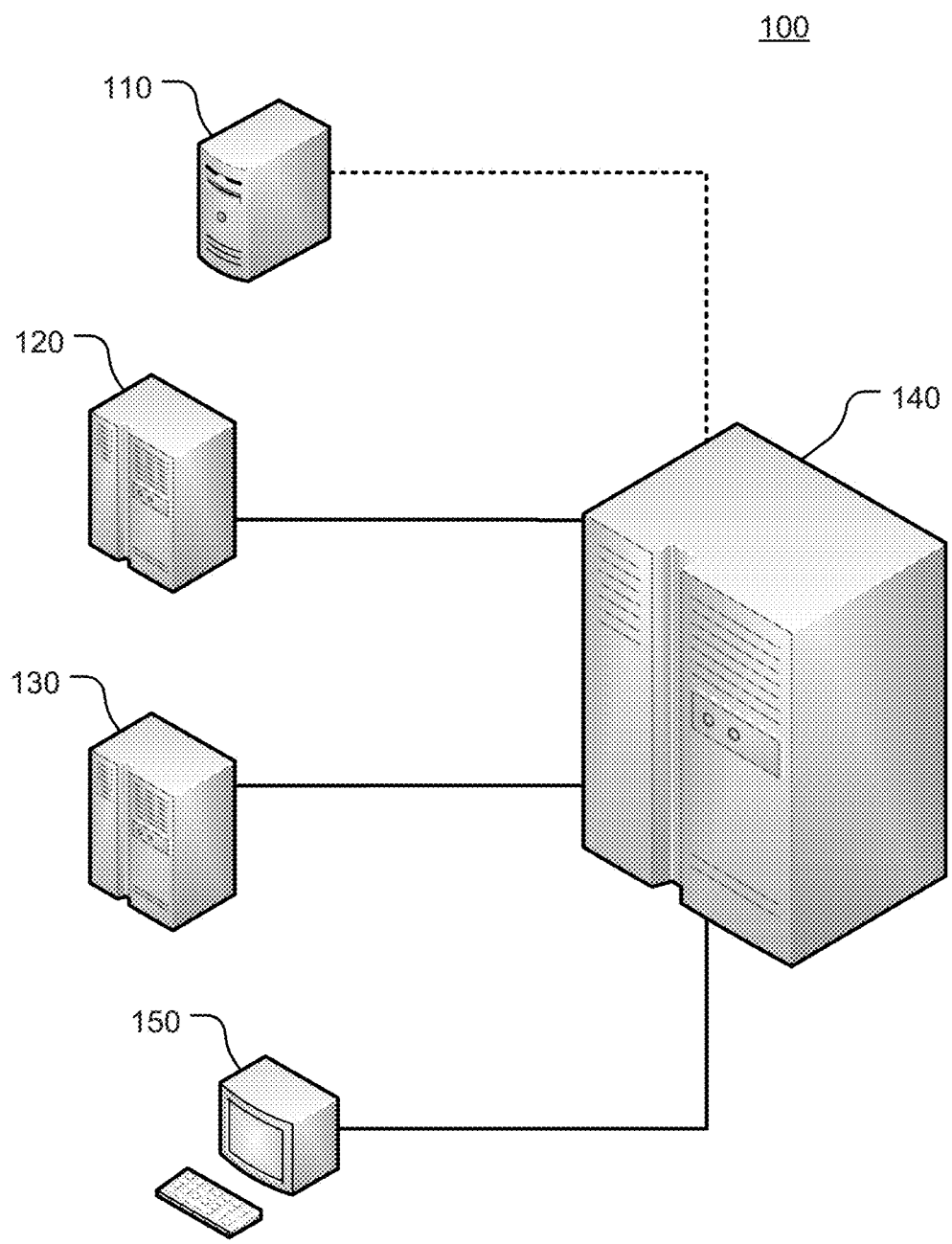
FIG. 1 depicts a system architecture for dynamic network optimization using geolocation and network modeling, according to an exemplary embodiment.

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

Exemplary embodiments may provide a system and method for dynamic network optimization using geolocation and network modeling. That is, exemplary embodiments may, among other things, improve network performance using geolocation or geolocation-derived information and/or network modeling.

As described above, providing high-powered base stations to cover relatively large geographical areas may improve mobile communications, but this limited approach may not adequately leverage network resources in a customized way to provide a high degree of precision for network optimization.

Self-organizing or self-optimizing networks (SONs) are emerging in various forms throughout the world. In a self-optimizing network (SON), various mechanisms may be used to determine whether or not a network is performing optimally for a given set of traffic conditions. A base station or base transceiver station (BTS) may contain configuration parameters that control various aspects of a cell site. Each of these parameters may be altered to change network behavior, based on observations of both the base station itself, measurements at the mobile station or handset, or other acquired data. For example, a self-optimizing network (SON) may automatically alter various network parameters if such changes would lead to a better user experience for some or all users. For instance, these network parameters may include transmit power levels, neighbors tables, antenna electrical tilts, antenna pointing direction/angles (e.g., elevation and/or azimuth), or handover thresholds (e.g., a device of a voice user on a heavily-used 3G network may be "encouraged" to handover to a GSM network base station in order to free up 3G resources for devices of existing or new data users on the network).

In some embodiments, a self-optimizing network (SON) may make small changes to the network configuration in order to improve network performance. For instance, the level of transmitter output power may be varied in order to grow or shrink the size of a cell, as the size of the cell is typically proportional to a general coverage area of a cell (or sector). By increasing the power of a few local base stations (BTSs) by 1 dB, for example, performance of the network may be improved. Other such adjustments in the network configuration parameters may be performed to balance a load across the network, to improve overall network capacity, or improve overall network coverage, and all this typically based on a pre-determined "typical" network traffic level. In other words, such a typical system may not account for current traffic existing in the network at a given point in time and adjust network behavior accordingly. Without using specific information related to current traffic conditions or geolocation or geolocation-derived information from users, poorer and much slower network optimization decisions may result.

Accordingly, specific information related to current traffic conditions or geolocation or geolocation-derived information, such as a user's location, speed or direction of movement (or absence of movement), historical behavior (e.g., a particular journey at a particular time each day, such as a rush hour to/from place of employment), or a user's "importance" to the network operator (e.g., if one or more users has a VIP status, is a high-spending individual that is valued by a network operator, part of a major corporate client, or a user who is paying extra for better service, etc.) may be used. Using such specific information may enable configuration parameters to be adjusted to provide enhanced network optimization decisions. SON-based network optimization may therefore be based on a calculated and pre-simulated network reconfiguration, where the calculated performance and hence network update recommendations are based upon measured, real-user experiences, at more precise (geolocated) locations, within the network's coverage area. This process may bring a degree precision and confidence to automated network reconfigurations previously unavailable. It should be appreciated that a self-optimizing network (SON) may continually search for a better network configuration by recommending the installation of installing one or more new base stations and the location or locations at which such base-stations could or should be installed, or by optimizing the use of using existing installed infrastructure.

By reconfiguring existing sites in a mobile communications network, performance within various aspects of a mobile communications network may be improved. For example, these may include, but are not limited to: network capacity, network coverage, data rates available from specific (or all) sites, the quality of service experienced by some or all users of a specific site or in a particular area of a network or in the complete network, a reduction in the number of call drops (again in one or all areas of a network), specific radio-related metrics (e.g., RSCP, Ec/No (energy per chip divided by total received power spectral density in a bandwidth of interest)), improved network coverage (e.g., improved indoor coverage, where an outdoor cell-site has the ability to penetrate within a building), pilot pollution (e.g., reduction in the number of pilots outside the active set but with similar power levels to those in the active set), etc.

As described, a typical approach involves making adjustments that are small or incremental. For instance, a transmit power level of one or more sites may be adjusted (e.g., increased or decreased) by a small/incremental value of approximately 1 dB. If such a change results in an improved network performance in the network, then additional incremental changes may be further contemplated. Such small incremental changes are not likely to have a catastrophic impact on network performance, and hence such a system may be more likely to be acceptable to a network operator. Accordingly, the possibility of such changes producing disastrous results, which may negatively impact large numbers of customers, may be minimized.

However, in circumstances where a larger proportionate change is needed, a simulation model as described herein may be more helpful. For example, a larger proportionate change may be based on the level of accuracy or confidence in the predictive power of the model or simulation. In such a scenario, an increase/decrease of 3 dB or more in power and perhaps a change in tilt angle of the antenna of 2 degrees or more, for example, may fall within the category of a larger proportionate change. As the simulation model evolves, it may be possible to process adjustments by different (greater) amounts, and thereby constitute an adjustment that is more than a small incremental change. Thus, by initially "modeling" (or simulating) potential changes before actual implementation and implementing a continual feedback loop after each simulated change, confirmation and successful application of each incremental step may be ensured.

In the system and method described herein, network changes may be proposed, analyzed, and implemented very quickly within seconds or minutes, using a network modeler or simulator. With increased speeds and implementation of dynamic response to traffic events in real-time or near real-time, a simulator may no longer be required to "freeze" an entire network for these changes to be implemented. Embodiments described herein may also balance key performance indicators (KPIs). For instance, improving some KPIs while negatively impacting others, such that the overall performance/capacity/user experience for the network may be improved.

As described herein, embodiments disclose a SON system that may be computationally efficient, since the system may simulate parts of a network that are focused on potential changes and the resulting simulations generally only cover parameters (and/or KPIs) of interest. This ultimately may allow the system to work efficiently and operate in real-time or near real-time. Further, the system's operation may be targeted at particular parts of the network, with little or no need to simulate an entire network, which in turn improves operational speed.

Finally, embodiments described herein may be historically selective. In other words, the SON system and methods described herein may "remember" a particular network configuration for a particular time on a particular day (e.g., morning rush hour on a Monday morning) and re-instate this configuration on the following Monday (and/or all subsequent Mondays outside of holiday periods). In this way, such a system may "learn" and provide a good starting point for common occurrences within a network. Because changes made by traditional SON systems are removed overnight, each day may start from the same baseline (any network improvements derived on the previous day are, typically, 'forgotten' overnight). Thus, using a "remembered" baseline helps to ensure that a network may not have to deviate too far from a known and working baseline that is capable of refining further improvements.

When calculated and targeted changes are made to the network, and when these changes are "known" before implementation in the network (e.g., via simulated modeling), a more precise tuning of a network may be provided. While it may not be certain what changes will be beneficial and how much a network will benefit, it should be appreciated that whatever benefit is experienced may be based on actual real-time or near real-time traffic levels, traffic types (e.g. data, voice, video), and traffic distributions present in the network at (or very close to) that time.

There are a number of metrics by which success of a particular change or changes to the network may be judged. For example, circuit-switch drops (CS drops) (e.g., number of dropped (voice) calls) may be one metric. Another metric may include data call drops (during an active or idle part of a data call). Another metric may include call blocked events, which may involve situations where insufficient network capacity prevents an initiated call from being made/connected.

Other metrics may be used as well. For example, an "available transmit power growth" metric for the base stations (BTS) in the area of the network under consideration may be used. This metric may analyze the "headroom" available at particular, or all, cell sites within the relevant network area and may compare to a maximum output power capability of each base station. There may be a number of options to be further considered. In general, the user experience in a network may improve (e.g., a stronger signal received by a user), to a large degree, based upon the transmit power of a base station to which the user is connected. A small value for the "available transmit power growth" may therefore be desirable. However, this may need to be balanced against the greater likelihood of interference from one cell to another. For example, if the transmit power is too high, this may impact user experience of the users in a nearby cell, which may suffer interference. Note that the interference here may be suffered by the users' handsets (typically) and not by the base station. Additionally, if a cell has a greater pilot power than another cell, it may cause user devices to connect to that cell even if its propagation loss is greater. This may cause a mobile device to transmit at a higher power level, in order to communicate with the more distant or otherwise weaker cell, resulting in reduced battery life and increased uplink interference.

A large value for the "available transmit power growth" may also be desirable as it is a measure of a cell's operating point and a low value may allow for increased traffic to be carried. A further option may be to aim to balance the "available transmit power growth" values for multiple base stations in a given area of a network. This may help ensure that the network has the maximum capacity to deal with unexpected traffic growth at any point in the network, without overloading the network (or at least minimizing the likelihood that the network would become overloaded).

Other metrics to judge success of a particular change or changes to the network may further be provided. For instance, burst (data) rate per user may be amalgamated for all users to produce a total throughput for the relevant area of the network (="sum of burst rates"), with higher values being desirable. Any other statistical measure may also be used, e.g., maximizing a percentage of users with data rates above a predetermined threshold, etc.

Received signal code power (RSCP) and/or Ec/No may be another metric. RSCP and/or Ec/No may be averaged for all users, in both cases or, again, looking at the percentage of users experiencing greater than a given threshold value.

"Pilot pollution," which may measure the number of pilot signals from adjacent (but irrelevant, from a handover perspective) base stations, may be another metric. Ideally, a mobile device or handset should not see any pilot signals from local base stations, which are not desirable handover candidates (the handset may waste time/network resources finding this out).

"User experience," which may measure a user experience, for example, where the call quality is sufficient to avoid a call drop but may be insufficient, in the user's view, to warrant continuing the call (in which case the user will choose to drop the call), may be yet another metric. This may occur because, for example, the radio link quality is too poor for an acceptable speech call, or the bit rate is too low, or the delay too great, etc. to provide a sufficient link quality for a packet based application Other threshold-based metrics may be used as well. Rather than relying upon an average value for a KPI parameter, which could mask an unacceptable result in a small number of cells, a threshold-based metric may ensure that all cells meet a given, minimum, standard in one or more crucial KPIs (e.g. call drops or data rates). Likewise, variance or standard-deviation based metrics may achieve a similar aim, in ensuring that a poorly-performing cell does not become worse (with the surrounding cells becoming better, hence yielding an improved overall average score); setting a minimum standard deviation, for example, ensures that all cells do not deviate too far from the mean performance More "complex" KPIs may also serve as another metric. In some instances, network operators may define their own KPIs, based upon combinations of network-reported KPIs. For example, a network operator may define a network-level "performance index" value, which may be a weighted combination of RSCP, Ec/No, and/or other parameters, with the SON system being tasked to maximize this "performance index" value, rather than one or more individual parameters (e.g. maximizing RSCP and Ec/No individually).

FIG. 1 depicts a system architecture for dynamic network optimization using geolocation and network modeling, according to an exemplary embodiment. It should be appreciated that system 100 is a simplified view of a system architecture, which may include additional elements that are not depicted. As illustrated, FIG. 1 shows the processing architecture for a self-optimizing network (SON) system 100. The system 100 may have various control/update features and may include various components. For example, system 100 may include a network database 110, an operations support system (OSS) 120, and a geolocation system 130. The system 100 may also include a SON optimizer 140, which may be communicatively coupled to a network database 110, an operations support system (OSS) 120, and a geolocation system 130, as well as one or more user equipment (UE) 150 to provide user input.

The geolocation system 130 may be used to determine geolocation or geolocation-derived data associated with a mobile device. For example, as discussed above, the geolocation system 130 may be used to receive information from a mobile device associated with geolocation, such as speed, direction of movement, etc., and may also use that information to calculate and determine where the mobile device is traveling so that this information could be further processed to provide improved allocation of network resources for one or more mobile devices in that network.

It should be appreciated that the geolocation system 130 may perform one or more geolocation techniques in accordance with at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties.

The system 100 incorporating a geolocation system 130 may be capable of geolocating individual users and associating these users and their locations with the various performance and measurement statistics captured by the user's handset and the cellular network. The SON optimizer 140 may be a data processing system that receives data from the database 110, the operations support system (OSS) 120, the geolocation system 130, and/or the user equipment 150. The SON optimizer may process the data from these inputs to generate a new network configuration (e.g., based upon the existing network hardware deployment), where the new network configuration may provide some measurable improvement over the existing network configuration.

The SON optimizer 140 may process a variety of input data. For example, the SON optimizer may receive a network configuration when subscriber records are captured. This may be received, for example, from the network database 110, the OSS 120, other similar network component, or any combination thereof. In some embodiments, the network configuration may include geographic locations of one or more base stations, their antenna heights, gains, radiation patterns and pointing angles (e.g., in both azimuth and elevation), transmit power levels, transceiver sensitivities, frequencies/channels/time-slots/spreading codes, etc. used at each base-station, neighbor relationships for each base-station, various thresholds defined for controlling handover decisions, and/or one or more capabilities of each base station, which may include, for example, various degrees of freedom available at each site for reconfiguration (e.g., transmit power level limitations, antenna pointing angle limits, etc.). It should be appreciated that the network configuration received and processed by the SON optimizer may be the configuration which was in place at the time the measurements (from the UEs) were taken. In other words, this network may or may not be the initial network configuration of the network when first designed or simulated. Thus, most or all network simulations performed within the SON optimizers may be based upon the network configuration at the time the relevant measurements were taken. This may therefore provide a higher possible degree of accuracy and improve the likelihood that simulated network changes will achieve their predicted KPI improvements, when implemented within the network.

The SON optimizer may also receive and process measurements taken by one or more UEs and/or reported by the OSS 120 (or similar network component). Such measurements may include received signal strengths, received signal quality, round-trip propagation delay measurements, geolocation information (if available, e.g. from GPS), QoS measurements, reports of radio link failure, etc. Received signal strength and quality measurements are made for the serving cell and for both intra- and potentially also, inter-frequency and inter-RAT neighbor cells. It should be appreciated that RAT may include any type of radio access technology, such as GSM, 3G, LTE, etc.

In addition to parameter measurements, several sets of messaging may be also captured and used by the SON optimizer 140. For example, RANAP messages, 3GPP RRC (Layer 3) messaging, and vendor-specific messaging (e.g., that reveals the call state plus any reconfigurations and services being requested and delivered) may be used. These messages may be helpful in classifying (for example) drops and blocks against the type(s) of service in progress.

The SON optimizer may further receive and process a variety of geolocation or geolocation-derived information from the geolocation system 130. Such information may be for a large number of UEs, including those with or without GPS capability or where such capability is disabled. It should be appreciated that this geolocation or geolocation-derived information may be calculated and provided by the geolocation system 130 itself, or cooperatively with other network components, such as the network database 110, the OSS 120, or other similar network component or system.

The SON optimizer 140 may also receive and process historic subscriber records (e.g., recent-historic, from the last few hours or days). These may be used to enable the SON optimizer 140 to assess the impact of any proposed network changes upon recent, typical, traffic levels, types (e.g., voice/data/video, etc.), and/or subscriber characteristics (e.g., VIPs vs low-ARPU (average revenue per user) subscribers). The impact of any network changes upon such (recent-historic) traffic may be representative of the impact of such changes upon the current and immediate-future traffic, and such information may be useful for improving network performance.

The SON optimizer 140 may also receive and process information from one or more user inputs via UE 150. In some embodiments, such information may be manually-entered data from a network operator/controller, and may include information or data that provides targets, constraints, or goals believed to help improve network performance. For example, the information received from UE 150 may be configured to control, suspend or limit runs of the SON optimizer to steer the aim of the changes by, for instance, selecting specific KPIs to include, emphasize or exclude, particular users or classes of users to "unfairly" benefit (e.g. VIPs). The SON optimizer may then use these targets and constraints to steer the outcomes and hence the proposed network changes. It may also be possible to set targets for the KPIs to achieve (e.g., at which point the emphasis may turn to other KPIs and their targets). The inputs may also be directed towards a particular area (e.g., geographical subset) of the network to work to optimize (e.g., leaving other areas largely unchanged). Finally, the SON optimizer 140 may also receive information associated with vectors containing the permitted range of the adjustments, which could be made (e.g., the constraints or limits within which the adjustments may be made).

Performance management statistics may also be used by the SON optimizer 140. These statistics may represent an aggregate cell-level (e.g., per-cell) performance data reported from each cell located within the area of interest in the network. From the present and historic values obtained, an overall view of the performance improvement or degradation may be obtained, resulting from any changes made to the network by the SON system 100.

While the SON system architecture 100 of FIG. 1 is depicted as comprising a network database 110, an OSS 120, a geolocation system 130, a SON optimizer 140 and a user input 150, it should be appreciated that a plurality of each of these components/systems may be used, in addition with other similar and compatible network systems and components.

In order for the network components of system 100 to function and communicate, these various components of the system 100, for example, may access a variety of internal and/or external databases. For example, the SON optimizer 140 may be communicatively coupled to one or more databases, which may contain data and information about base station locations, antenna types/gains/pointing angles, power output capability, capacity/capability, and/or other base-station and network resource related information. It should be appreciated that the SON optimizer 140 may also store this type of information itself, may share the load with other such databases, or may rely on such data to be stored entirely on these databases. The internal/external databases may store a variety of other information. For example, the databases may store information that identifies subscribers using its service and for which service features are subscribed. The databases may store information, such as a subscriber's customer name, identification number, services, or other identifiers, whether a user's mobile communications devices 110A-110G are switched on or off, as well as device capabilities, For example, these may include which air interface standards, such as GSM, W-CDMA, LTE. etc., the mobile device may be capable of utilizing for communications. It should be appreciated that these databases may be highly robust and may further store geolocation information, geolocation-derived information, and other information suitable for providing dynamic network optimization and network simulation.

It should be appreciated that the contents of these databases may be combined into fewer or greater numbers of databases and may be stored on one or more data storage systems and in more than one format. The data storage systems may be local, remote, or a combination thereof to clients systems, servers, and/or other network components. Information stored in the databases may be useful in providing additional customizations for improved allocation of network resources and/or other related services.

Communication between the various service providers, subscribers, and/or components of the system 100 described herein may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

Figure 2:
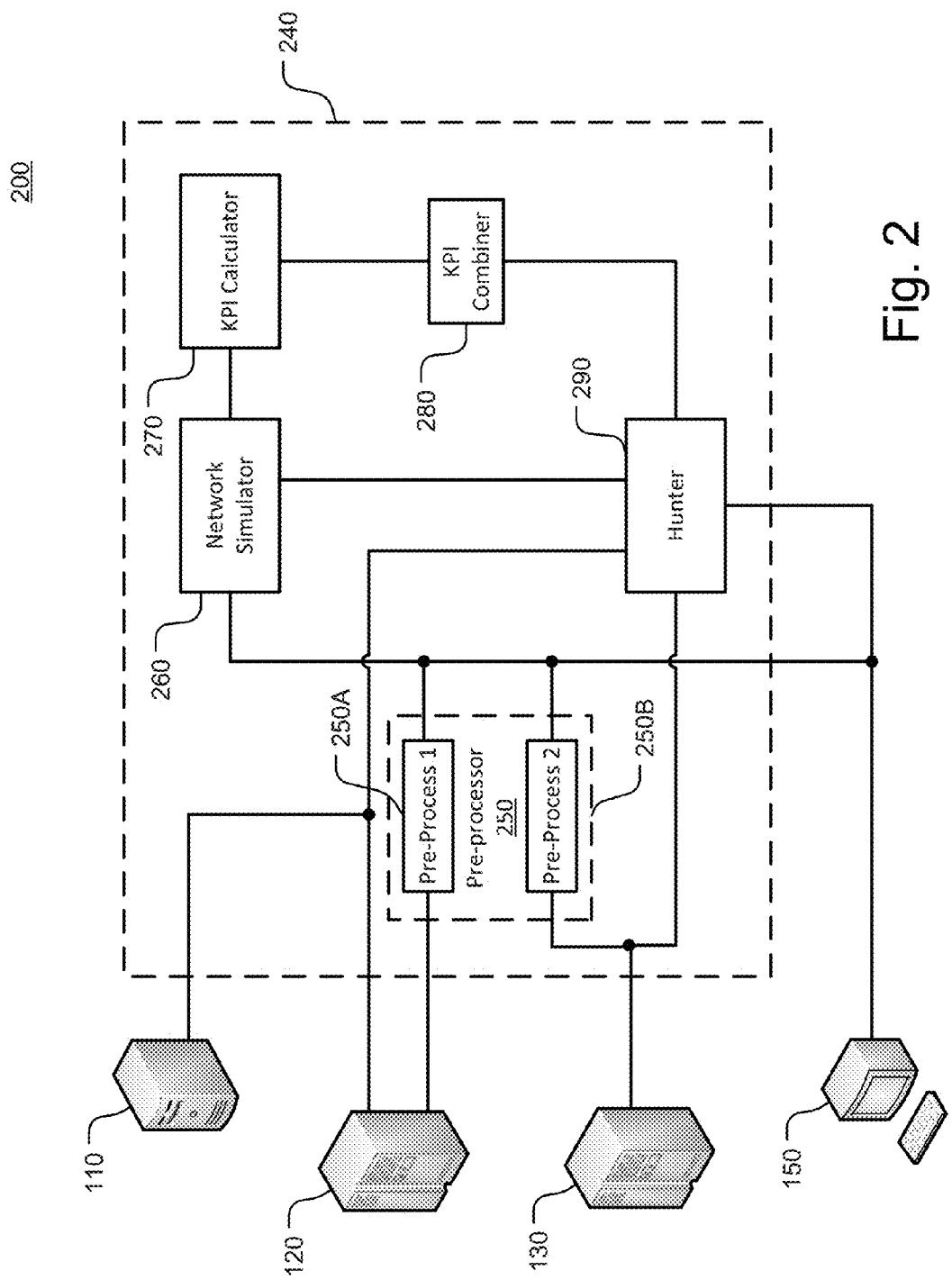
FIG. 2 depicts a geo-based SON system for dynamic network optimization using geolocation and network modeling, according to an exemplary embodiment.

FIG. 2 depicts a geo-based SON system for dynamic network optimization using geolocation and network modeling, according to an exemplary embodiment. It should be appreciated that FIG. 2 is a more detailed and functional depiction of FIG. 1, focusing on SON optimizer 240. Referring to FIG. 2, the SON optimizer 240 may include a pre-processor 250, a network simulator 260, a KPI calculator 270, a KPI combiner 280, and a hunter 290.

These various components and/or any other network elements, computers, and/or components associated with the SON optimizer 240 or other component of system 200 may include one or more modules or additional components. As used herein, the term "module" may be understood to refer to computing software, firmware, hardware, cloud-based processing systems, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Referring to FIG. 2, actual and/or current network configuration information, like in system 100 of FIG. 1, may be received by the SON optimizer 240 from the network database 110 and/or OSS 120. More specifically, the OSS 120 may provide performance measurement statistics ("PM stats") for individual sectors in a network, which may be received at a pre-processor 250, e.g., at the pre-process 1 250A. In some embodiments, the PM stats may allow key performance indicators (KPIs) to be measured and judged. For example, if a network change leads to an improvement in these KPIs, then these PM stats may be retained (or implemented). If the KPIs are degraded, on the other hand, then the network change may be reversed (or not implemented).

It should be appreciated that the PM stats may be obtained using a variety of methods, by the system. For example, in some embodiments, cell-level PM stats may be received by the system from each BTS in the network. These values may be measured (directly or indirectly) by the base stations themselves and may be reported separately for each base-station/sector. Such measurements may provide BTS downlink power levels (at the point of transmission) and/or measurements of received signal strength, for signals transmitted from the UEs. Other types of additional PM stats may also be received from the same or other sources within the network.

Individual subscriber records for each user in the relevant area of the network may also be received at the pre-processor 250, e.g., at the pre-process 2 250B. In some embodiments, this relevant area may be the area upon which the SON system is designed or configured to operate. This level of detail may be helpful in achieving precise, targeted, network improvements. Rather than an average level of performance measured across a given cell or sector, such specific information received at the pre-processor 250 may make it possible to select network parameters (e.g., a transmit power level or an antenna pointing angle), changes in which could lead to an overall improved performance (e.g., data rate) for most users in a sector.

The pre-processor 250 may provide several outputs. The first output may include "drop model" information. The drop model for each cell or sector under consideration by the SON system may include details of dropped calls, such as a location at which a call was dropped (or the latest known position prior to the call being dropped), a time at which it was dropped and/or any other relevant details (e.g., whether the call was a voice call or a data call). Each subscriber record (call segment) for each user, emanating from the geolocation system 130, for example, may be made up of call segments, with each call segment containing details of at least some of the following: the RF measurements, geolocation, user experience, speed of travel, 'location confidence', service type, active set, best cell, and/or other similar data associated with that segment of the call. These segments may also contain information on whether the call was dropped during that segment of the call, service-related information (e.g., if the connection is circuit-switched or packet-switched etc.), duration of the segment, start/end connection flags and, in some cases, information regarding the user's experience during that call segment. In some embodiments, the network simulator 260 may use this information to predict likely call drops (or probability of a call drop), based upon Ec/No, RSCP, or similar metrics, which it may generate as a part of network simulation activities. When compared with analysis from actual network data (e.g., prior to any network modifications being proposed by the hunter and/or simulator), modelled call drops may be used as a mechanism for calibrating the network simulator 260 and allow adaptive learning. It should be appreciated that the blocking of an attempted call set-up (e.g., due to the network being congested), which may be reported separately, may also be treated in a similar manner to a call drop, and be reported, by the pre-processor to the network model in a similar fashion.

The second output may be cell transmit power levels. In some embodiments, these may be actual, reported, cell (BTS) transmit power levels for each cell in the relevant area of the network or, in cases where these are not available for particular sites, an estimated power level may be used. Typically, such estimates may be based upon the UE measurements of signal quality. In scenarios where such measurements are not available, a default value may be used instead, e.g., a fixed estimate of the average transmit power for any other cells in the affected network or a fixed percentage—(e.g. 75%)—of the maximum transmission power. Other bases for estimation may be provided and contemplated.

The third output may involve pre-calculated metrics. For example, the pre-process 250 may pre-calculate metrics for most or all of the call segments. This means that for any configuration change that does not affect a particular call segment, its metrics may not need to be recomputed. This may be helpful in achieving a high level of efficiency for the implementation (and hence a fast execution speed).

The network simulator 260 may receive data from the pre-processor 250 and incorporate a "network model" to perform network modeling or simulation analysis. In some embodiments, for example, the network simulator 260 may receive proposed cell groups or parameters to change from the hunter 290, which may look for possible improved network configurations, and may simulate a version of the network incorporating these changes. It should be appreciated that in some embodiments, the simulation may be performed off-line (e.g., prior to any changes being made to the network) so as not to interrupt normal SON optimizer operations as well as to determine whether such changes would be actually beneficial to actually implement.

It should also be appreciated that the "network model" may largely be a copy of the network model held by the OSS 120 and/or network database 110, but with some changes/corrections/additions/simplifications as needed by the SON optimizer 240, together with the models created during the pre-processing stage (e.g., the call-drop model, etc.). Furthermore, simplifying the model, e.g. by simulating aspects which are germane to the desired outputs or network area, may help to greatly speed up execution and improve the timeliness of implemented SON improvements.

The KPI calculator 270 may calculate key performance indicators (KPIs) for the network. These KPIs may be what is expected based on the simulated experiences of actual users who would be affected by the proposed change simulated by the network simulator 260, should the changes be made in the real network.

It should be appreciated that the network model within the SON optimizer 240 may consist of elements from both the OSS 120 and/or the network database 110. The OSS 120 may, for example, omit parameters such as base-station location (latitude/longitude), antenna height (amsl), antenna down-tilt angle, and details on the antenna's radiation pattern (in azimuth and elevation), some or all of which may be provided by the network database 110 or other source. Moreover, the network model may be simplified so that it contains details of the particular area of the network upon which the SON system 200 is operating (as opposed to the complete network model, which would reside between the OSS and the network planning tool/database). This may allow processing to be performed more rapidly and in a more efficient system than would otherwise be the case, since it does not need to simulate the entire (e.g., country-wide) network.

As described above, the hunter 290 may be a processing component that interacts with the network simulator 260 to contribute and provide one or more constraints or other input information. Such constraints may gather data, to refine the simulation analysis performed by the network simulator 260, from a variety of sources. For example, the hunter 290 may receive constraint input information from the network operator's user terminal (or other source), subscriber records (individual subscriber locations, QoS measures, RSCP, etc.), and/or a network plan (as defined by the OSS 120 and/or the network database 110). The hunter 290 may process these inputs from one or more of these various sources to generate various outputs, which may then feed into the network simulator 260. In some embodiments, it may be determined that, based on the properties of a group of cells, it would be more beneficial for the hunter 290 and the simulator 260 to jointly determine best configuration for that group.

In some embodiments, the hunter 290 may generate a filtered version of the subscriber records which may have originated from the OSS 120. These records may be filtered to remove unwanted or irrelevant information, which the network simulator 260 may not need. For example, the network simulator 260 may need information about/from subscribers who spent at least some time on a call within the (coverage) area of interest in the network (the coverage area within which the SON system can make changes and the surrounding areas which could be impacted by any such changes). Any call records not pertaining to either of these two areas may be filtered out and therefore not passed to the network simulator 260. In other words, the hunter 290 may serve as a refining mechanism so that the network simulator 260 may not be burdened with unnecessary information that may cause delay or extraneous processing requirements. While this filtering process is described as taking place within the hunter 290, it should be appreciated that such filtering may occur at a number of points within the system as well, such as pre-processor 250 or other component in the system 200.

Furthermore, in some embodiments, the hunter 290 may generate and propose groups of cells comprising more than one cell that should be jointly optimized. For example, coupling between a group of cells by radio propagation or other means, may mean that for a sub-set of cells, a simulation that considers the cells jointly may produce significantly better outcomes than cell-by-cell optimization.

Furthermore, in some embodiments, the hunter 290 may generate and propose a new network configuration, for example, consisting of new/updated power levels (and/or antenna down-tilt angles etc.) for some or all of the base-stations within the area being considered.

This information outputted by the hunter 290 may be received by the network simulator 260, which is similar in operation and configuration to the conventional network simulators produced to initially design cellular networks. Its operation will therefore not be described in detail here. The network simulator 260 required within the SON optimizer system 200, however, may be a simplified version of a full conventional network simulator (e.g., one capable of considering only certain parameters) and may be limited in its features. For example, a simplified network simulator 260 may not make recommendations regarding geographic locations of base-stations (since these are already deployed by other system components). The reason for using a simplified network simulator 260 within the SON system (relative to a full network simulator which could be used to design an entire network from scratch) may be for efficiency purposes. The network simulator 260 may be required by the SON system 200 to apply relative changes to the parameters measured in subscriber records. An absolute model of the radio environment may not be required. In fact, propagation effects may have already been calibrated by the users themselves (via their UE measurement reports) and using a full network simulator may increase redundancy and processing delay.

Furthermore, using a simplified network simulator within the SON optimizer allows real and very recent subscriber records (from actual subscribers who recently used the relevant parts of the network) to be utilized and analyzed, perhaps in real-time or near real-time, e.g., from the last few tens of minutes, hours or days. Full network simulators typically use much older subscriber records (perhaps taken from a GSM system or a 3G system, when designing an LTE system) or no subscriber records at all, or drive-test results, or a combination of these or similar distant-historic data records. The use of recent data allows a very up-to-date and relevant network simulation to be undertaken, thereby resulting in a much more accurate and useful SON optimization and also an optimization that follows ongoing trends in network traffic—hourly, daily, weekly, monthly etc. This tailored approach may result in a more efficient and effective SON optimization process.

The result of the network simulation may be a set of updated/changed subscriber records, e.g., records detailing what the subscriber experience of the real (recent) users would have been had the network been configured as proposed by the hunter 290. These records may then be fed to a "network model" (which may form a part of the network simulator 260) that may convert these "simulated real" user experiences into a set of "simulated real" network KPIs. For example, one of the network-level KPIs may be a number of dropped calls within the network, or a portion thereof. In this case, the network model may predict which users would have suffered call drops, had the network been configured as proposed by the hunter 290. Likewise the network model may predict which users, whose calls were actually dropped in the real network, would not have suffered a dropped call had they been using a network with a configuration as proposed by the hunter 290.

The KPIs resulting from this modeling exercise (e.g., termed "unmerged KPIs" Error! Reference source not found.) may then be merged with the equivalent KPIs from parts of the network left untouched or unaffected by the proposed network changes (e.g., termed "untouched KPIs") in the KPI combiner 280. The resulting "merged KPIs" may then form a kind of feedback input to the hunter 290. Based on this feedback, which in effect would communicate and tell the hunter 290 how well or how poorly the KPIs (as set by the network operator) are impacted by the changes to the network it had proposed, the hunter 290 may then either suggest an improved set of changes or recommend that the changes just proposed (and analyzed) are implemented within the system 200, by the OSS 120 (hence the output link from the hunter to the OSS in FIG. 2). In essence, the system may decide if this proposed new configuration is closer to the KPI target set by the network operator than any other configuration tried so far. Additionally, based on this feedback the hunter 290 may then propose that different groups of cells be jointly simulated to search for improvements.

One advantage of this approach, namely that of running the above process based upon individual user records/experiences, rather than a cell-wide (or "average") experience is that various scenarios may be examined at an individual user level. For example, the impact upon particular categories of user (e.g., VIPs) may be assessed and any decision to update the network may be adjusted in favor of such users (if this is the network operator's policy). Also, by minimizing the number of cells that should be simulated jointly, the speed of the algorithm may be enhanced.

Figure 3:
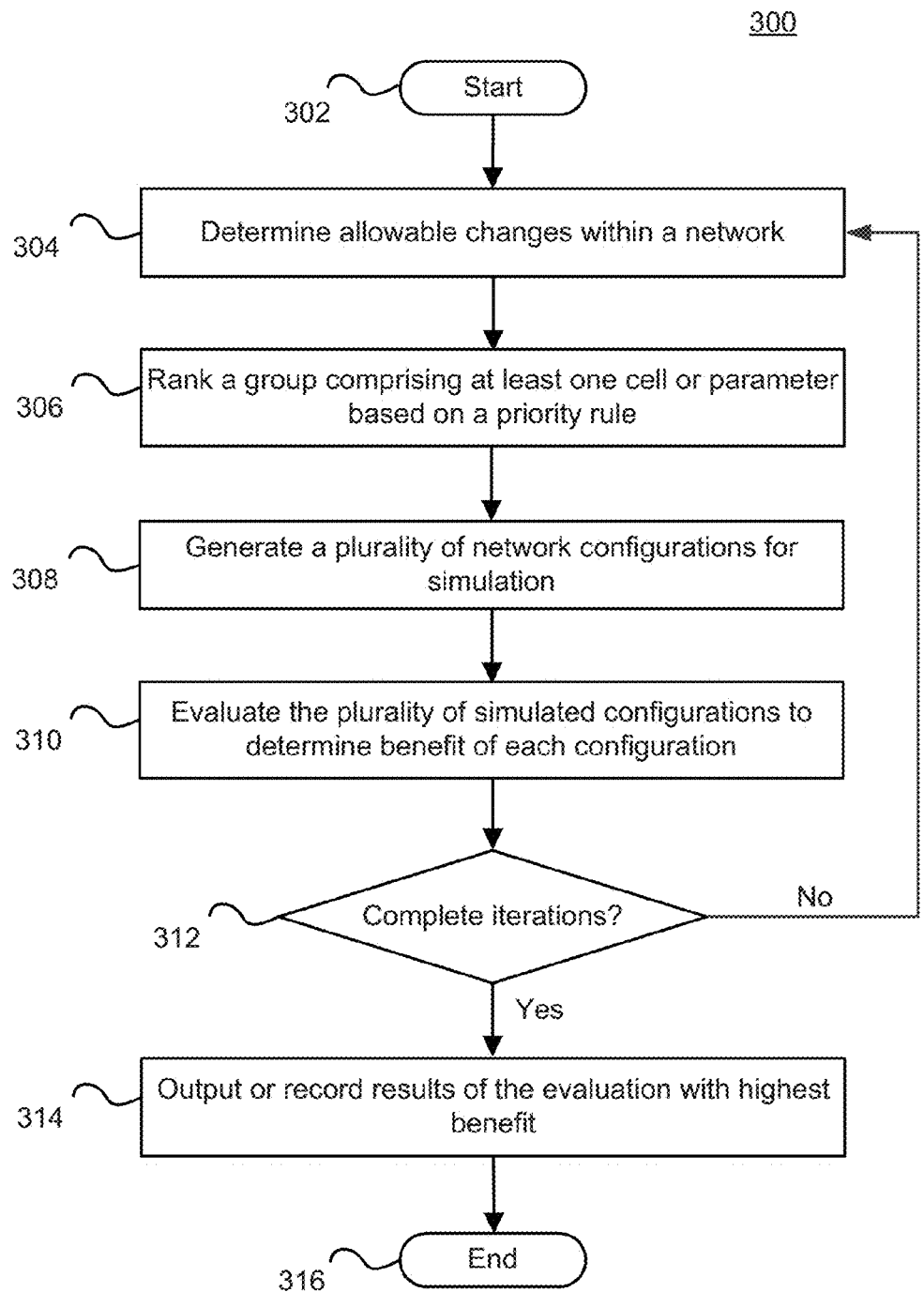
FIG. 3 depicts a flowchart of a method for dynamic network optimization using geolocation and network modeling, according to an exemplary embodiment.

FIG. 3 depicts a flowchart of a method for dynamic network optimization using geolocation and network modeling, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least system architecture 100 in FIG. 1 and SON system 200 in FIG. 2, by way of example, or more particularly by the hunter 290, as depicted in FIG. 2, and various elements of systems 100 and 200 are referenced in explaining the exemplary method of FIG. 3. Each block shown in FIG. 3 represents one or more processes, methods, or subroutines carried in the exemplary method 300. A non-transitory computer-readable medium comprising code, which when performed by a computer may perform the acts of the method 300 may also be provided. Referring to FIG. 3, the exemplary method 300 may begin at block 302.

At block 304, allowable changes within a network may be determined, for example, by the hunter 290 of system 200 of FIG. 2. In some embodiments, determining such allowable changes may include testing some or all areas for each parameter type to assess potential for change. In other words, this may be an exploratory action to determine the following: what could be changed (e.g., transmit power, antenna downtilt etc.), where the changes are permitted within the network (e.g., base-station sectors which are allowable to be changed, typically set by the operator), and the amounts by which changes are permitted (e.g., 0.5 degree increments in antenna downtilt or 0.5 dB changes in output power), etc. This action may then make changes to one or more base-station sector/cell groups in a virtual model of the network and evaluate the outcome of the changes. In some embodiments, this may be based on the expected impact such changes would have had on real call segments, from real network users, located in the relevant parts of the network (e.g., the parts of the network which could be impacted by the changes, as determined by the network neighbor cells which the real users' devices could recognize). It should be appreciated that in some embodiments, it may be determined, based on strength of interaction between cells, that one or more cells should be jointly optimized.

At block 306, a group comprising at least one cell or parameter may be ranked based on a priority rule. In some embodiments, this may involve many possible changes and ranking their impact on KPIs. These changes may take several forms. For example, these may include: (i) a singular change to all base station cell groups in a predetermined area of the network; (ii) multiple changes on the same base station cell group in a predetermined area of the network, and (iii) a single change to a single cell group in a predetermined area of the network. Other variations may also be provided.

With regard to (i), for example, the same or singular change (e.g., a change in downtilt angle by 1 degree) may be made on all base-station sectors, within a given area of the network (or, indeed, a whole network, if desired) one by one (but see alternative embodiment, below). In other words, a change in one sector may be made, to simulate and store the result, then reverse the change, then make the change in the next sector, simulate and store the result, then reverse the change, and so on, until all desired sectors may have been assessed. Further, the change may implement the (single) change which generates the largest KPI improvement or implement all changes which generate a great KPI improvement than a given threshold.

With regard to (ii), for example, multiple parameter changes may be made on the same BTS sector, either individually assessing (by simulation) their impact (before reversing the change) or assessing their combined impact, before reversing the change, and storing the result. This process is repeated for all desired sectors. Again, the best change or changes may then be implemented (as above).

With regard to (iii), for example, a single change may be made to a single cell or sector and assess the impact that this change (and hence this sector) has upon the overall performance of the area of the network under consideration. Based upon the results of this analysis, the trialing/implementation of further similar (or different) parameter changes may be made. This may take the form of larger or smaller changes to the same parameter as was originally changed, or changes to an entirely different parameter.

In some embodiments, for example, multiple parameter changes may be made on the same BTS cell group to assess the impact that the joint change of parameter combinations for the group has on the overall performance of the area of the network under consideration.

Note that a key part of evaluating the success of a particular change may be to examine any detrimental effects it has on the network, as well as any advantageous effects. The best choice may be to combine a useful improvement in one or more areas of network performance, with a zero or minimal negative impact on other areas of network performance.

It should be appreciated that the function of the hunter 290 may be to identify groups of one or more cells, where, in case the group contains more than one cell, membership of the group may be determined by the relative impact of a change to one cell in the group when compared to the performance indicators of other members of the group. Once the set of groups is determined, ranking the groups may be achieved in a manner dependent on the relative change in the network KPIs caused by a small change to the parameters in one or more of the cells in the group. Once the ranking of the groups is set, in some embodiments, starting with the highest ranked group simulate network performance enhancement for that group, the hunter 290 may choose the simulated configuration with best performance for that group, update the planned set of recommendations assuming that configuration, and move to the next highest ranked cell group. To continue the process, the hunter may traverse through the entire set of cell groups to generate a planned set of recommendations for all the cells in the group.

At block 308, a plurality of network configurations may be generated for network simulation. In some embodiments, a new set of configurations may be proposed to try, based upon the best-rated configurations (taking into account as constraints similar things as for the aforementioned actions, e.g., permissible power level increments etc.). These new configurations may also be simulated, evaluated, and ranked in a similar manner, as described above. In some embodiments, block 308 may be optional.

At block 310, the plurality of network configurations may be evaluated based on the network simulation, for example, to determine benefit of each of the plurality of network configurations. In other words, the worth of each of the simulated configurations may be assessed. In some embodiments, the best simulated configurations (so far) may be recorded and/or outputted. It should be appreciated that evaluating the value of each simulated configuration and picking the best change or changes may be performed prior to implementing any change or changes in a real, live network.

At block 312, a decision may be made as to whether method will continue. In some embodiments, if evaluating a predetermined number of the combinations of groups is not completed, then the method 300 may cycle back to block 304. A predetermined number of iterations of the combination of groups may be all, some, or one group. It should also be appreciated that such a combination of groups may also be limited by a predetermined period of time as well. If all the iterations required for evaluation has been completed, then the method 300 may proceed to block 314.

At block 314, a set of network configurations that is strongest among the plurality of network configurations may be outputted. In some embodiments, the final result may be sent to the OSS 120, for example, for implementation in a real, live, network. Again, this is assuming the result meets all predetermined criteria (e.g., a sufficient improvement in one or more KPIs and a minimal/tolerable degradation in all other metrics).

At block 316, the method 300 may end.

It should be appreciated that other various embodiments may also be provided. For example, in one embodiments, the following may be implemented: (i) Try a single change for each cell and parameter-type in the cluster of cells under consideration (e.g., within the chosen area of the network) and then measure simulated impact; (ii) Rank these changes by magnitude of the simulated impact; (iii) Simulate, in order of decreasing simulated impact (e.g., biggest impact first), all allowed combinations of the cell and parameter on top of the accumulated set of selected changes so far. After each set of simulations, update the overall set of selected changes with the best of the combinations just simulated (as long as this is better than making no change); (iv) Stop and apply this whole (and-self consistent) set of changes to the real network.

In another embodiment, the method 300 may involves picking a single change (e.g., an increase in transmit power level by 1 dB) and applying this change (in simulation) simultaneously to all cells/sectors within the network area under consideration. Once this change has been simulated, the simulation model of the network may then be restored to match the real network and a different change is applied (e.g., a decrease in transmit power level by 1 dB).

In this scenario, the cells may then be ordered, based upon their impact upon network performance, once a change has been made (to all cells, simultaneously)—despite all cells having undergone the same (virtual) change, some may provide a greater network benefit and others less so (or even a negative benefit, e.g., a detriment). This change may then be implemented on all cells/sectors for which a benefit (above a minimum threshold, which could be zero) is seen.

It should be appreciated that for the cell/sector which has greatest impact, a range of other changes may also be simulated, on that cell alone (e.g., greater changes in power level, or changes in antenna downtilt angle) and the beneficial changes uncovered by this process may then be implemented in the real network. Similarly, the cell/sector with the second-greatest impact may be evaluated (e.g., in simulation) with a range of parameter changes, and the beneficial changes to its configuration then implemented in the real network, and so on, for all or a majority of cells where a beneficial impact was originally seen.

The above processes, for the above or any similar processes, may also incorporate one or more well-understood optimization techniques, such as genetic algorithms and/or simulated annealing algorithms/techniques. Other various combinations may also be contemplated and provided.

By using the embodiments described herein, a network plan may be specifically adjusted to improve overall network performance. If such changes are made regularly and amassed over a suitable period of time, QoS may be enhanced for a variety of users in the network. Such a system may allow a network that more accurately and reliably adjusts to changes and may give much more precise information on how to more efficiently utilize network resources. Furthermore, it may allow a network operator to better serve his more important customers and/or better serve the whole community of users on his network. For instance, the SON optimization system described herein may allow an operator to make choices about how to better optimize his network to serve the types of user he most wishes to attract and retain and, consequently, maximize the revenue from a particular network configuration. It may also allow the network operator to better understand where to make additional investments in network capacity and to predict what impact these investments would have on revenues and hence profitability.

The system 200 may also include other various components, subsystems, or modules. For example, a subscriber module may be used to identify user/subscriber specific information. For example, the subscriber module may identify a type of mobile device, which may in turn provide information about its various capabilities. The subscriber module may also determine current service requests, e.g., voice or data. This information may be used to further provide improved allocation of network resources and improved signal strength/quality for one or more mobile devices in that network. A network module may also be used to identify past, current, and future capabilities of network resources and allocate and reallocate these resources to better optimize a network for a plurality of mobile devices on the network.

An error logging and reporting module may also be implemented to produce logs, reports, or other information associated with improving allocation of network resources using geolocation and handover management. It should be appreciated that any or all of these components, systems, subsystems, and/or modules described here may be communicatively coupled to one or more databases or storage/memory units (not shown), locally or remotely, so that information may be stored for later use or processing.

Figure 4:
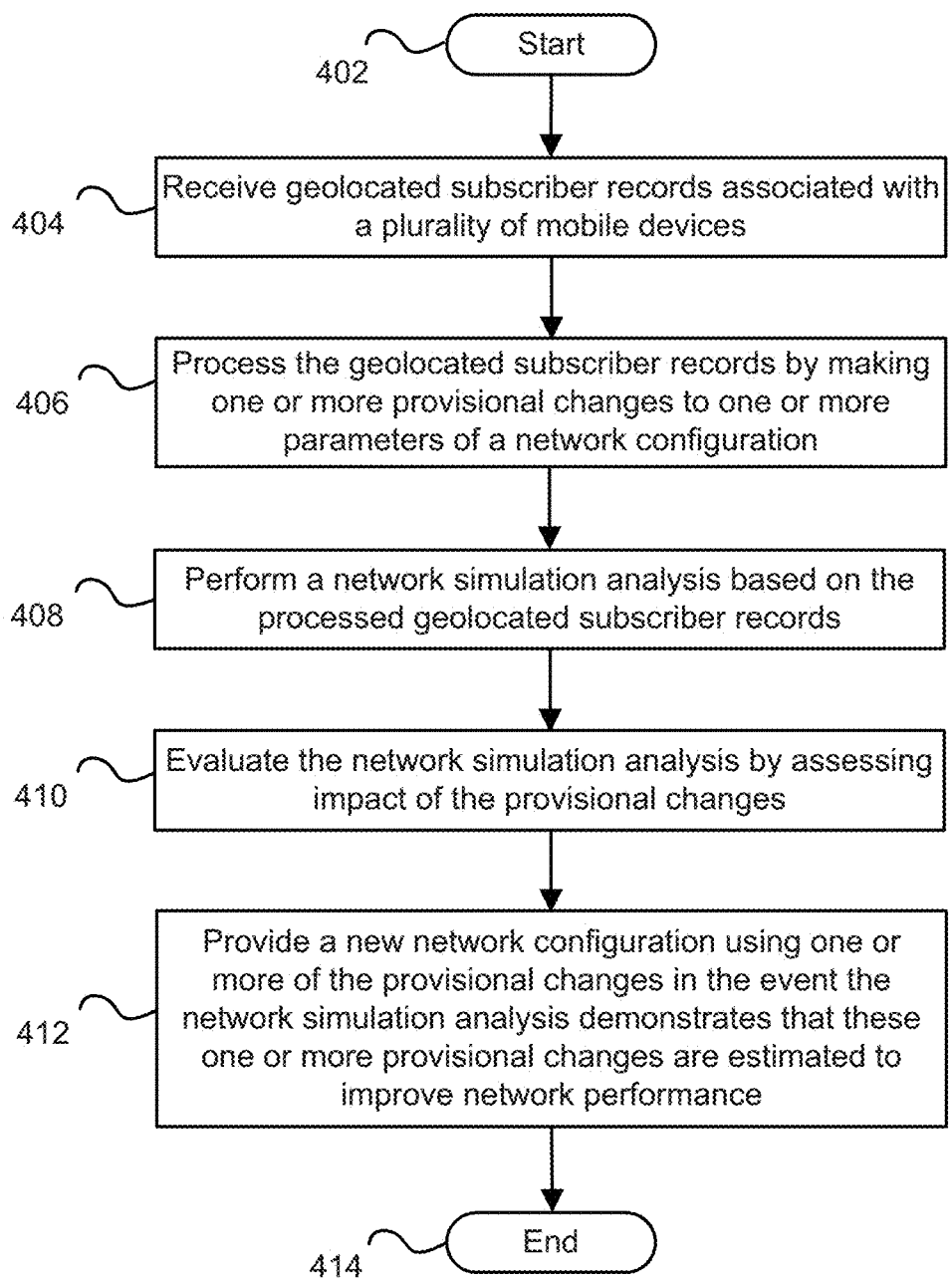
FIG. 4 depicts a flowchart of a method for dynamic network optimization using geolocation and network modeling, according to an exemplary embodiment.

FIG. 4 depicts a flowchart of a method for dynamic network optimization using geolocation and network modeling, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system architecture 100 in FIG. 1 and SON system 200 in FIG. 2, by way of example, and various elements of systems 100 and 200 are referenced in explaining the exemplary method of FIG. 4. Each block shown in FIG. 4 represents one or more processes, methods, or subroutines carried in the exemplary method 400. A non-transitory computer-readable medium comprising code, which when performed by a computer may perform the acts of the method 400 may also be provided. Referring to FIG. 4, the exemplary method 400 may begin at block 402.

At block 404, geolocated subscriber records associated with a plurality of mobile devices may be received from a data collection system. Real subscriber data may be used in order to determine which changes may be beneficial to those subscribers and which changes will be estimated to be most beneficial. Since the subscriber data is available in near real-time (seconds or minutes not hours or days), timely changes may be made to the network to quickly respond to events (i.e. whilst such events are happening/emerging). This ability to react quickly may a significant benefit of the approach taken, even though it may not be utilized in all situations.

At block 406, the geolocated subscriber records may be processed. In some embodiments, the processing may comprise making one or more provisional changes to one or more parameters of a network configuration. In some embodiments, processing the geolocated subscriber records may also comprise processing performance measurement statistics from a database. For example, the database may be a network database, an operation support system (OSS) database, or other similar database system. Ultimately, making changes to one or more parameters and simulating the impact of those changes may help determine the "best" change or changes to make to the real network.

At block 408, a network simulation analysis may be performed based on the processed geolocated subscriber records. In some embodiments, the network simulation analysis may comprise making one or more provisional changes to one or more parameters of a network configuration based on the processed performance measurement statistics. In some embodiments, the network simulation analysis may comprise performing the network simulation analysis using the one or more provisional changes to the one or more parameters.

At block 410, the network simulation analysis may be evaluated. In some embodiments, the evaluation may include assessing impact of the provisional changes made to the network configuration. In some embodiments, the impact may be based on how the provisional changes are estimated to improve network performance. In some embodiments, for example, the impact of the provisional changes made to the network configuration may also be determined based on network performance meeting or exceeding one or more network performance thresholds.

It should be appreciated that utilizes a simple (and quick to execute) network model in order to assess the impact of the changes may be helpful. Simplicity may be important for various reasons.

First, it may target the actual users of the network at the locations where they are placed, at (or near to) the time and place at which the changes are to be made. It may therefore not analyze all areas of the network's theoretical coverage.

Second, it may inherently focus on the areas of the network within which the proposed changes will be made, together with any nearby cells which could be impacted by the changes, with the cells to be analyzed in this way being determined by what the actual users' devices can recognize in the network, at that point in time, or might be able to see as a result of any changes to network parameters (i.e., the neighbor cells reported by those devices and which could be handed off to, if a network change was made to the cell they are currently using, or an adjacent cell). For example, a reduction in transmit power to the cell they are using may make an adjacent cell more attractive and hence their device would hand-over to that cell; equally, an increase in transmit power in an adjacent cell may increase the interference and hence reduce the quality of service experienced by the user and/or make that cell a better candidate to use, thereby encouraging the user's device to hand over to that adjacent cell.

Third, it may manipulate the measured characteristics of each subscriber record in response to changes in the network parameters, avoiding the need to build distributions or other higher level representations of the subscribers.

At block 412, a new network configuration may be provided. In some embodiments, the new network configuration may incorporate the one or more provisional changes when the network simulation analysis demonstrates that these provisional changes will improve network performance. In other words, the one or more provisional changes may be implemented in the event these changes are determined to be relatively impactful to network performance. It should be appreciated that the relative impact may be determined based on comparison to analysis of other provisional changes to the one or more parameters based on other geolocation subscriber records and user experiences in a similar relevant area of the network during a similar period of time.

One or more changes may be implemented once a range of other possible changes have been analyzed/simulated, and based upon the real user distribution and experiences in the relevant area of the network, at that time. Accordingly, the "best" change(s) may be the changes that are implemented, thereby ensuring that solid, valuable, network improvements are made, not just transitory, minor, incremental benefits.

At block 410, the method 400 may end.

Figure 5:
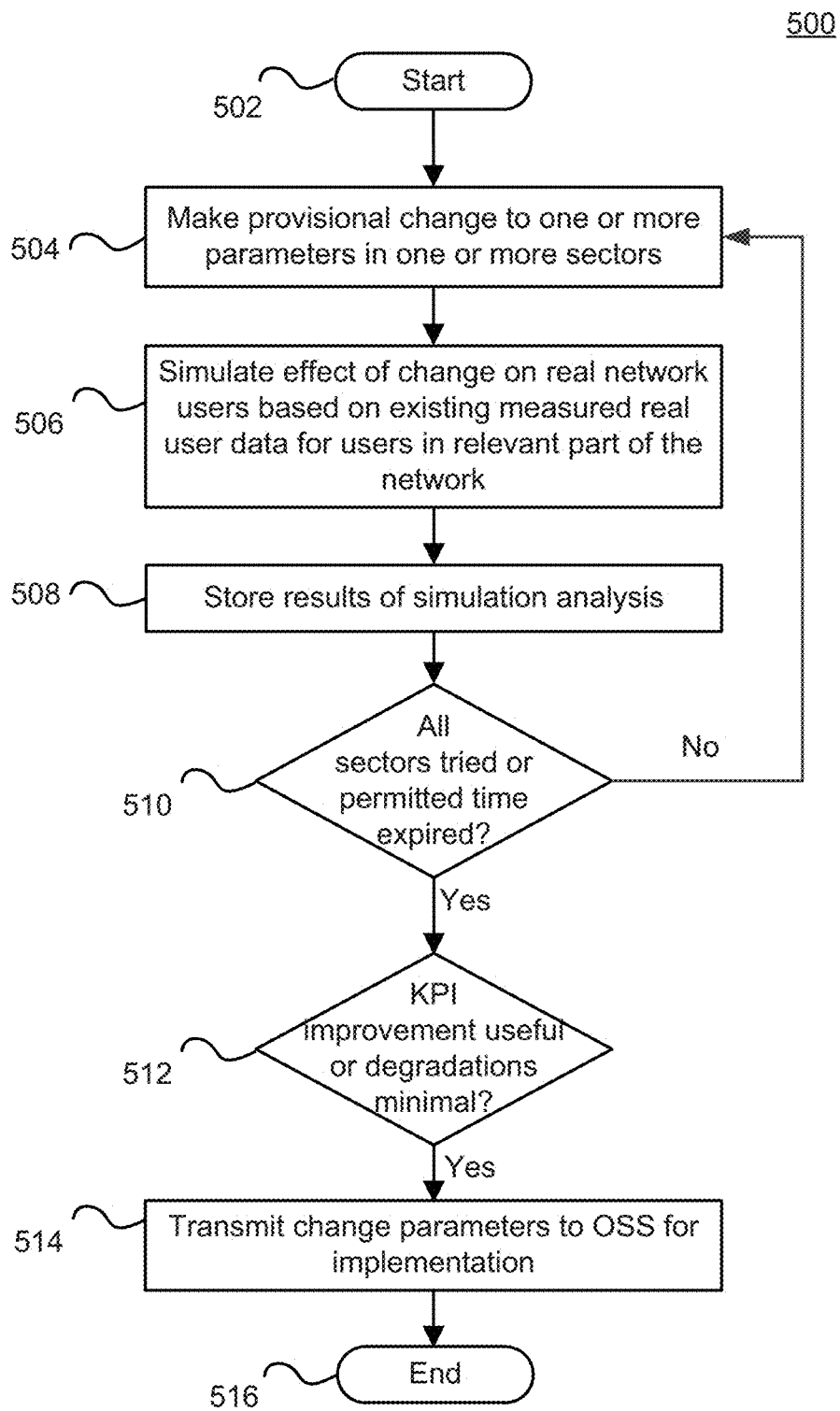
FIG. 5 depicts a flowchart of a method for dynamic network optimization using geolocation and network modeling, according to an exemplary embodiment.

FIG. 5 depicts a flowchart of a method for dynamic network optimization using geolocation and network modeling, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system architecture 100 in FIG. 1 and SON system 200 in FIG. 2, by way of example, and various elements of systems 100 and 200 are referenced in explaining the exemplary method of FIG. 5. Each block shown in FIG. 5 represents one or more processes, methods, or subroutines carried in the exemplary method 500. A non-transitory computer-readable medium comprising code, which when performed by a computer may perform the acts of the method 500 may also be provided. Referring to FIG. 5, the exemplary method 500 may begin at block 502.

At block 504, provisional changes may be made to one or more parameters in one or more sectors. In some embodiments, the one or more parameters may be selected and changed in one or more base-station cells in a group of one or more base-station cells, in a virtual model of the mobile network. The parameters that could be changed may include the transmit power of the base-station, the downtilt angle of the base-station antenna, or any other parameter that may be remotely-controlled within the network (i.e., the changing of the parameter does not require a site visit or other form of human intervention and does not involve the deployment of a new base-station site or the geographical movement of an existing base-station site). The methods may also be applied to parameters which would involve a site visit.

At block 506, effect of change on real network users may be simulated based on existing measured real user data for users in a relevant part of the network. In other words, the effect of making the above change (or changes) to the network parameter(s) may then be simulated using a simplified model of the network. In some embodiments, the simulation may evaluate the effect of the simulated change(s) upon real, recent, current or historical, users of the area of the network in which the (virtual) change has been made. The aim, then, may be to predict how the experience of these users would have been different, if the proposed change had been implemented in the real network at the time the measurements were made, based upon the users doing exactly the same things that they had actually done (i.e., walking/driving the same route, using the same services on their devices for the same amount of time etc.). The output of the simulation may be one or more network KPIs, based on, for example, the successful calls which are now simulated to become dropped calls and vice-versa, the data rates which were achieved by individual users, and/or VIP users and the rates which would have been achieved with the proposed configuration, etc.

At block 508, results of the simulation analysis may be stored, e.g., in one or more database systems. In some embodiments, the results of the simulation (e.g., KPI scores, any negative impacts, etc.) may then be stored in a database, along with details of the proposed change(s) made and on which sector(s) the changes were made. Other various information and data relevant to network optimization may also be stored.

At block 510, it may be determined whether all (or a predetermined number of) sectors have been tried or have been analysis within a permitted time frame. If the answer is "no," the method 500 may cycle back to block 504. If the answer is "yes," then the method 500 may proceed. In other words, in some embodiments, it may be asked whether all of the required BTS sectors have been evaluated (i.e., all proposed changes have been tried on all proposed sectors and the results of each stored) or whether the permitted execution time has been reached. In the event that further sectors/changes require evaluation and sufficient execution time is still available, then the method 500 may repeat from the start, with the sector or parameter incremented to enable the next evaluation to take place.

At block 512, it may be determined whether KPI improvement is useful or degradations minimal. If the answer is "no" (meaning improvements are not useful or that the degradations are not negligible), then the method 500 may end or restart. If the answer is "yes," the method 500 may proceed. In the event that the permitted execution time has expired or that all sectors/parameters have been evaluated, then the method 500 may then decide if any (or more than one) of the proposed changes meets the required criteria (improved KPIs and tolerable or no degradation in other areas). If the required criteria for network improvement have not been met, then the algorithm simply ends with no changes being sent to the OSS. The method 500 may then be run again, as required, perhaps targeting a different parameter or parameters or a different area of the network or it can be repeated at a different time of day or week (e.g. rush hour or when a convention comes to town etc.).

At block 514, if the changes appear acceptable, the provisional changes of the parameters may be transmitted to the OSS, for example, for implementation in a real network. This process may be a manual, automatic, or semi-automatic process.

At block 516, the method 300 may end.

It should be appreciated that the evaluation/simulation may be based upon all (relevant) segments of a call and not just a single evaluation per call. The system may detect if any call segment would, for example, have resulted in a dropped call, had the proposed change been implemented in the real network, prior to that call segment taking place. This may be a much more powerful and exact measure of network resilience than, for example, a generic average metric for each complete call.

As discussed above, subscriber records may be used to update a network configuration. For example, use of geolocation information of a large number of users, together with various user inputs that provide control of runs or constraints on network simulations, amassed over incremental periods of time, may allow a SON optimizer to better simulate a network and ultimately provide an updated network configuration that improves network service (e.g., voice, data, video, GSM, 3G, LTE etc.) at multiple various points in the network. Such a detailed network overview may provide more precise information as to how to improve the network in a more efficient and specific way, without impeding normal operation. Therefore, according to other embodiments, this level of detail in a geolocation system, as described herein, may provide much better balancing of network resources.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that dynamic network optimization using geolocation and network modeling in accordance with the present disclosure as described above typically involves the processing of input data and the generation of output data to some extent. This input data processing and output data generation may be implemented in hardware or software. For example, specific electronic components may be employed in a network optimization module or similar or related circuitry for implementing the functions associated with providing improved allocation of network resources using geolocation and handover management in accordance with the present disclosure as described above. Alternatively, one or more processors operating in accordance with instructions may implement the functions associated with identifying potential malware domain names in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
   receiving, by a device and from a data collection system, geolocated subscriber records that are associated with a plurality of mobile devices accessing a network, wherein the geolocated subscriber records are available to the device in real-time or near real-time;
   processing, by the device, the geolocated subscriber records,
      processing the geolocated subscriber records including processing performance measurement statistics from a database comprising a network database and an operation support system (OSS) database;
   performing, by the device, a network simulation analysis that simulates real-time or near real-time behavior of the network based on the processed geolocated subscriber records and a plurality of altered configurations of a parameter of a base station that controls behavior of a cell site; and
   providing, by the device and to another device, a new network configuration in real-time or near real-time based on the network simulation analysis,
      the new network configuration including at least one of the plurality of altered configurations of the parameter of the base station.

2. The method of claim 1, wherein the plurality of altered configurations of the parameter are based on the processed performance measurement statistics.

3. The method of claim 1, further comprising:
   analyzing the network simulation analysis by assessing an impact of one or more provisional changes made to a network configuration.

4. The method of claim 3, wherein the impact is based on how the one or more provisional changes improve network performance.

5. The method of claim 4, wherein the impact is based on network performance meeting or exceeding one or more network performance thresholds.

6. The method of claim 3, further comprising:
   implementing the one or more provisional changes based on assessing the impact.

7. The method of claim 6, wherein assessing the impact of the one more provisional changes made to the network configuration is based on an analysis of other provisional changes, based on other geolocation subscriber records and other user experiences occurring in another area of the network during a period of time associated with implementing the one or more provisional changes made to the network configuration.

8. The method of claim 1, further comprising:
   evaluating, by the device, the network simulation analysis by assessing a simulated impact of the plurality of altered configurations on the real-time or near-real time behavior of the network,
      the new network configuration being provided based on assessing the simulated impact.

9. A non-transitory computer-readable medium storing instructions, the instructions comprising:
   a plurality of instructions that, when executed by a processor of a device, cause the processor to:
      receive geolocated subscriber records that are associated with a plurality of mobile devices accessing a network, wherein the geolocated subscriber records are available to the device in real-time or near real-time;

process the geolocated subscriber records,
wherein the plurality of instructions, that cause the processor to process the geolocated subscriber records, cause the processor to:
process performance measurement statistics from a database comprising a network database and an operation support system (OSS) database;

perform a network simulation analysis that simulates real-time or near real-time behavior of the network based on the processed geolocated subscriber records and a plurality of altered configurations of a parameter of a base station that controls behavior of a cell site; and provide, to another device, a new network configuration in real-time or near real-time based on the network simulation analysis,
the new network configuration including at least one of the plurality of altered configurations of the parameter of the base station.

10. The non-transitory computer-readable medium of claim 9, wherein the plurality of instructions further cause the processor to:
analyze the network simulation analysis by assessing an impact of one or more provisional changes made to a network configuration.

11. The non-transitory computer-readable medium of claim 10, wherein the impact of the one or more provisional changes made to the network configuration is based on network performance meeting or exceeding one or more network performance thresholds.

12. The non-transitory computer-readable medium of claim 10, wherein the plurality of instructions further cause the processor to:
implement the one or more provisional changes based on assessing the impact of the one or more provisional changes made to the network configuration.

13. The non-transitory computer-readable medium of claim 12, wherein assessing the impact of the one more provisional changes made to the network configuration is based on an analysis of other provisional changes, based on other geolocation subscriber records and other user experiences occurring in another area of the network during a period of time associated with implementing the one or more provisional changes made to the network configuration.

14. The non-transitory computer-readable medium of claim 9, wherein the plurality of instructions further cause the processor to:
evaluate the network simulation analysis by assessing a simulated impact of the plurality of altered configurations on the real-time or near-real time behavior of the network,
the new network configuration being provided based on assessing the simulated impact.

15. A device, comprising:
one or more processors to:
receive, from a data collection system, geolocated subscriber records that are associated with a plurality of mobile devices accessing a network, wherein the geolocated subscriber records are available to the device in real-time or near real-time;

process the geolocated subscriber records,
where the one or more processors, when processing the geolocated subscriber records, are to process performance measurement statistics from a database comprising a network database and an operation support system (OSS) database;

perform a network simulation analysis that simulates real-time or near real-time behavior of the network based on the processed geolocated subscriber records and a plurality of altered configurations of a parameter of a base station that controls behavior of a cell site; and provide, to another device, a new network configuration in real-time or near real-time based on the network simulation analysis,
the new network configuration including at least one of the plurality of altered configurations of the parameter of the base station.

16. The device of claim 15, wherein the one or more processors are further to:
analyze the network simulation analysis by assessing an impact of one or more provisional changes made to a network configuration.

17. The device of claim 16, wherein the impact of the one or more provisional changes made to the network configuration is based on network performance meeting or exceeding one or more network performance thresholds.

18. The device of claim 16, wherein the one or more processors are further to:
implement the one or more provisional changes based on assessing the impact of the one or more provisional changes made to the network configuration.

19. The device of claim 18, wherein assessing the impact of the one more provisional changes made to the network configuration is based on an analysis of other provisional changes, based on other geolocation subscriber records and other user experiences occurring in another area of the network during a period of time associated with implementing the one or more provisional changes made to the network configuration.

20. The device of claim 15, wherein the one or more processors are further to:
evaluate the network simulation analysis by assessing a simulated impact of the plurality of altered configurations on the real-time or near-real time behavior of the network,
the new network configuration being provided based on assessing the simulated impact.

* * * * *